O. L. FULTON.
TRUCK ATTACHMENT FOR SEEDERS AND DRAGS.
APPLICATION FILED MAY 21, 1913.
1,095,962.
Patented May 5, 1914.
Fig. 1.
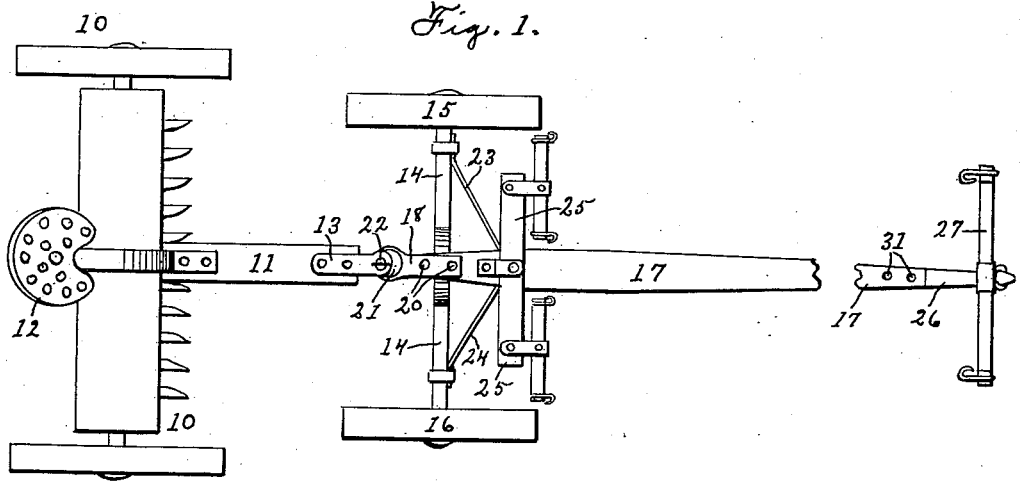
Fig. 2.
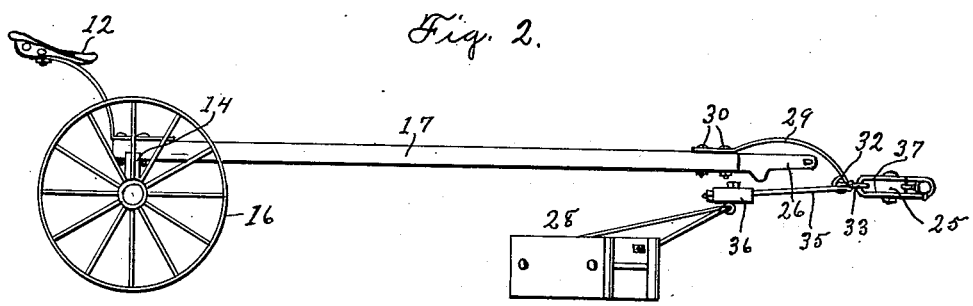
Fig. 3.
Fig. 4.
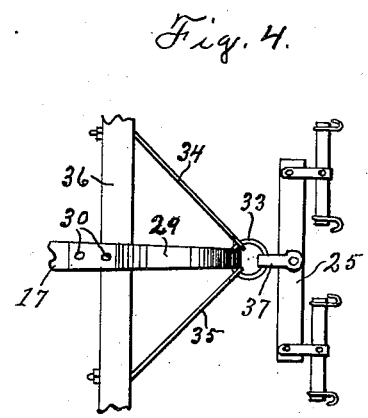
WITNESSES:
H. G. Sweet.
R. S. Kirkpatrick
INVENTOR:
OTTO L. FULTON
By Earl M. Sinclair
Atty.

UNITED STATES PATENT OFFICE.

OTTO L. FULTON, OF PETERSON, IOWA.

TRUCK ATTACHMENT FOR SEEDERS AND DRAGS.

1,095,962.  Specification of Letters Patent.  Patented May 5, 1914.

Application filed May 21, 1913. Serial No. 769,068.

*To all whom it may concern:*

Be it known that I, OTTO L. FULTON, citizen of the United States of America, and resident of Peterson, Clay county, Iowa, have invented a new and useful Truck Attachment for Seeders and Drags, of which the following is a specification.

The object of this invention is to provide an improved truck attachment adapted to be used interchangeably with a seeder or drag and receive hitching connections thereof.

A further object of this invention is to provide an improved truck adapted to be attached in front of a seeder and receive draft connections thereof and also adapted to be attached at the rear and receive draft connections of a drag.

A further object of this invention is to provide improved means for preventing side lash of a force feed seeder.

A further object of this invention is to provide improved means for supporting draft devices of a drag.

A further object of this invention is to provide improved means for mounting a driver's seat relative to a drag.

My invention consists in the construction, arrangement and combination of elements hereinafter set forth, pointed out in my claims and illustrated by the accompanying drawings, in which—

Figure 1 is a side elevation illustrating my improved device attached to a force feed seeder. Fig. 2 is a side elevation illustrating the device attached to a drag. Fig. 3 is a detail sectional elevation, on an enlarged scale, of connections between the seeder and truck attachment. Fig. 4 is a detail plan of connections between a drag and the truck attachment.

In the construction and application of the device as shown the numeral 10 designates generally a force feed seeder of common form adapted to be driven by one wheel. The seeder is provided with a stub tongue 11 and a removable seat 12 mounted thereon. A clevis 13 is fixed to the forward end of the stub tongue 11. The truck attachment is formed with an axle 14, preferably rectangular in cross-section and of metal and arched in its central portion. Supporting wheels 15, 16 are pivotally mounted on end portions of the axle 14. A draft and steering tongue 17 is mounted across and notched on its lower side to receive the arched portion of the axle 14. A strap 18 overlies and extends rearwardly from the rear portion of the tongue 17 and a bar washer 19 underlies the rear portion of said tongue and the axle 14. Bolts 20 extend through the strap 18 and bar washer 19 on opposite sides of the axle 14 and hold said parts together. The strap 18 is formed with an eye 21 in its rear end adapted to extend within and be pivotally connected to the clevis 13 by means of a pin or bolt 22. The tongue 17 may also be connected to the axle 14 by brace rods 23, 24. Swingletrees 25 are removably mounted on the tongue 17 and are adapted to receive attachment of draft animals. The tongue 17 is provided with a tip 26 on its forward end, on which may be loosely mounted a neck-yoke 27.

In practical use of this device with a seeder, the seeder and truck are connected as shown and described and the draft animals are hitched to the tongue. It is well known that seeding is practically the first farm work to be done in the spring of the year, and that the draft animals are apt to be soft and unaccustomed to field work. The seeder is wide and the ground more or less rough, and there is considerable side lash of the seeder tongue due to obstruction of alternate seeder wheels. This causes soreness of shoulders and necks of the draft animals and also results in irregular sowing. That is, the drive wheel is held back by a clod, rut or hole and stops sowing; then moves rapidly and plants too thickly for a space. Both these objections are overcome by the use of my improved truck attachment, which absorbs all the side motion of the seeder tongue, through its pivotal connection therewith, and also permits the seeder wheels to move regularly and uniformly.

When it is desired to use the truck attachment in connection with a field drag, such as is shown and designated generally by the numeral 28, the truck is detached from the seeder and the seat 12 preferably is removed from the seeder tongue 11 and mounted on the rear portion of the tongue 17. The neck-yoke 27 is removed and a curved connecting bar 29 is fixed at its rear end to the tongue 17 at the rear of the tip 26 by means of bolts 30 passing therethrough and through holes 31 in said tongue. The connecting bar 29 arches forwardly and downwardly over the forward end of the tongue 17 and terminates in an eye 32 on which a ring 33 is loosely mounted. Draft rods 34, 35 are suitably attached to an evener bar 36 of the drag 28 and converge forwardly to points of attachment pivotally on the ring 33. The evener bar 36 is mounted transversely beneath the connecting bar 29 and tongue 17 and is suitably attached to the drag 28. The swingletrees 25 are detached from the tongue 17 and are connected to the ring 33 by means of a clevis 37. By this means the swingletrees are carried in the air and not permitted to drag on the ground or bump the heels of the draft animals; and the driver is given an opportunity of riding without adding his weight directly to the drag.

I claim as my invention—

1. A truck attachment for seeders and drags, comprising an axle, wheels pivoted thereon, a tongue crossing and fixed to said axle, draft devices on said tongue, and pivotal connecting means on each end of said tongue.

2. A truck attachment for seeders and drags, comprising an axle, wheels pivoted thereon, a tongue on said axle, a seat removably mounted on said tongue, a connecting bar fixed to the rear end of said tongue, a curved connecting bar fixed to the forward end of said tongue, and swingletrees carried by said bar.

3. A truck attachment, comprising an axle, a tongue fixed to said axle, wheels pivoted on said axle, a curved connecting bar removably fixed to the forward end of said tongue, and swingletrees carried by said bar.

Signed by me at Peterson, Iowa, this 25th day of April, 1913.

OTTO L. FULTON.

Witnesses:
 ARCHIE W. EVANS,
 G. N. GORDON.

---

Copies of this patent may be obtained for five cents each, by addressing the "Commissioner of Patents, Washington, D. C."